United States Patent
Oh

(10) Patent No.: US 12,139,131 B2
(45) Date of Patent: Nov. 12, 2024

(54) SYSTEM, METHOD, INFRASTRUCTURE, AND VEHICLE FOR AUTOMATED VALET PARKING

(71) Applicants: HYUNDAI MOTOR COMPANY, Seoul (KR); KIA MOTORS CORPORATION, Seoul (KR)

(72) Inventor: Tae Dong Oh, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 94 days.

(21) Appl. No.: 16/731,231

(22) Filed: Dec. 31, 2019

(65) Prior Publication Data

US 2020/0207336 A1 Jul. 2, 2020

(30) Foreign Application Priority Data

Dec. 31, 2018 (KR) .................. 10-2018-0173420

(51) Int. Cl.
*B60W 30/06* (2006.01)
*B62D 15/02* (2006.01)
*G05D 1/00* (2024.01)

(52) U.S. Cl.
CPC .......... *B60W 30/06* (2013.01); *B62D 15/0285* (2013.01); *G05D 1/0217* (2013.01)

(58) Field of Classification Search
CPC . B60W 30/06; B62D 15/0285; G05D 1/0217; G05D 2201/0213
See application file for complete search history.

(56) References Cited

U.S. PATENT DOCUMENTS 9,576,490 B1 * 2/2017 Wang ............... G08G 1/096838
2010/0156672 A1 6/2010 Yoo et al.
(Continued)

FOREIGN PATENT DOCUMENTS

CN 104627175 B 3/2017
CN 107672585 A 2/2018
(Continued)

OTHER PUBLICATIONS

European Search Report issued on May 29, 2020 from the corresponding European Application No. 19220110.1, 9 pp.
(Continued)

*Primary Examiner* — Jelani A Smith
*Assistant Examiner* — Toya Pettiegrew
(74) *Attorney, Agent, or Firm* — Lempia Summerfield Katz LLC

(57) ABSTRACT

An autonomous valet parking method includes: activating an automated valet parking procedure; determining, by a parking infrastructure, a plurality of guide route candidates leading from a pickup zone to a target position; determining, by the parking infrastructure, weighting factors for the plurality of guide route candidates; selecting, by the parking infrastructure, one guide route candidates among the plurality of guide route candidates as a guide route to the target position; transmitting the target position and the guide route to the vehicle; performing, by the vehicle, autonomous driving to the target position along the guide route; performing, by the vehicle, autonomous parking at the target position, and finishing the automated valet parking procedure.

14 Claims, 13 Drawing Sheets

(56) References Cited

U.S. PATENT DOCUMENTS

| | | | | |
|---|---|---|---|---|
| 2014/0324334 A1* | 10/2014 | Nakashima | ........ | G01C 21/3629 |
| | | | | 701/431 |
| 2016/0200317 A1* | 7/2016 | Danzl | ................. | B60W 10/04 |
| | | | | 701/25 |
| 2016/0247109 A1* | 8/2016 | Scicluna | ................ | G08G 1/202 |
| 2017/0082449 A1* | 3/2017 | Suzuki | ............... | G01C 21/3667 |
| 2017/0144656 A1* | 5/2017 | Kim | ................... | B62D 15/0285 |
| 2017/0212511 A1 | 7/2017 | Paiva Ferreira et al. | | |
| 2018/0050690 A1* | 2/2018 | Kurt | ..................... | G05D 1/0212 |
| 2019/0050764 A1* | 2/2019 | Zhou | .................... | G06Q 10/047 |
| 2019/0122561 A1* | 4/2019 | Shimizu | ............ | G01C 21/3469 |
| 2019/0370572 A1* | 12/2019 | Nagpal | ..................... | G06T 7/62 |
| 2020/0001862 A1* | 1/2020 | Luo | ........................ | G06V 20/58 |
| 2020/0218269 A1* | 7/2020 | Kanoh | ................. | B60W 40/04 |
| 2021/0300349 A1* | 9/2021 | Hara | .................... | B60W 10/20 |

FOREIGN PATENT DOCUMENTS

| | | |
|---|---|---|
| CN | 108891411 A | 11/2018 |
| JP | 2008203167 A | 9/2008 |
| JP | 2011054116 A | 3/2011 |
| JP | 2015076027 A | 4/2015 |
| KR | 20100071804 A | 6/2010 |
| KR | 20170070480 A | 6/2017 |
| WO | 2007122960 A1 | 11/2007 |
| WO | 2018086308 A1 | 5/2018 |

OTHER PUBLICATIONS

Office Action cited in corresponding Japanese application No. 2019-239405; Oct. 5, 2023; 10 pp.

Office Action cited in corresponding Korean application No. 10-2018-0173420; Sep. 8, 2023; 14 pp.

\* cited by examiner

| Step | Infra | Vehicle |
|---|---|---|
| <1> AVPS START | • Recognize and qualify an appropriate user (by user ID and PW) and vehicle (by unique number assigned to vehicle)<br>• Manage driving authority (receiving driving authority from the user/return the driving authority to the user)<br>• Transmit automated driving start instruction to vehicle | • Perform engine ON/OFF or power ON/OFF according to the instruction of infra<br>• Lock the vehicle according to the instruction of infra |
| <2> DETERMINATION OF TARGET POSITION AND GUIDE ROUTE | • Determine the target position, guide route, and permissive driving area, and deliver these information to vehicle | |
| <3> AUTONOMOUS DRIVING | • Instruct automated driving (start, stop, re-start) to vehicle | • Drive along the guide route designated by infra within the permitted driving area as a speed of ≤[kmph] or less<br>• Drive within the path and width designated by infra without deviation<br>• Drive along a curve with the minimum inner radius of the road designated by the infra without deviation<br>• Drive on a path with the gradient less than or equal to the maximum gradient designated by infra |
| <4> POSITION MEASUREMENT (vehicle, obstacle) | • Be aware of and manage vehicle location<br>• Detect and recognize vehicles and obstacles (TBD), and monitor safety driving and parking operation of each vehicle (supervise) | • Estimate its own position<br>• Inform the infra of its estimated position / with the accuracy and frequency specified below (TBD)<br>• Inform the infra of its own status<br>• Detect the following obstacles (TBD) |
| <5> AUTONOMOUS PARKING | | • Park and stop the vehicle at the target position designated by infra (equivalent to PAPS parking requirements) |

Fig. 4A

| Step | Infra | Vehicle |
|---|---|---|
| <6> EMERGENCY BRAKE | • Continue to instruct automated driving to vehicle when safety is ensured as a result of safety confirmation, and to instruct the vehicle to perform an emergency stop if safety is not confirmed | • Start/emergency stop/re-start automated driving according to the instruction of infra<br>• Perform an emergency stop in case where a potential hazard is determined as a result of the detection mentioned above<br>• Immediately decelerate at the rate of (TBD) m/s² and stop, when the following conditions are met (1) vehicle received an instruction from infra for E/S (2) vehicle detected an obstacle (TBD)<br>• After coming to a stop, the vehicle shall remain stopped until it receives an instruction from infra to resume automated driving<br>• Vehicle shall re-start suspended driving or parking when it receives an instruction to start automated driving from the infra after confirming that there is no obstacle ahead in the path |
| <7> AVPS END | • After the vehicle completes automated driving and parking, the infra transmits vehicle control release instruction to the vehicle | • Perform engine ON/OFF or power ON/OFF according to the instruction of infra<br>• Lock the vehicle according to the instruction of infra<br>• Mechanically fix or restrain wheels using such as the parking brake |
| <8> FAULT CONTROL (communication or vehicle fault) | • Detect communication faults between the infra and vehicle | • Detect faults in communication with infra during driving<br>• Detect vehicle's faults (e.g. part failure, human or animal remaining inside the vehicle, etc.)<br>• Perform emergency stop when above fault is detected<br>• After coming to a stop, the vehicle shall remain stopped until it receives an instruction from infra to resume automated driving |

Fig. 4B

| DATA | Contents | Transmit (T)/ Receive (R) | | Regularly(P)/ Event(E) Transmission | Note |
|---|---|---|---|---|---|
| | | Infrastructure | Vehicle | | |
| (1) Vehicle qualification information | ID number (VIN) to identify each vehicle | R | T | When entering the parking | None |
| (2) Automated driving preparation instruction | — | T | R | Right before automated driving start | |
| (3) Vehicle information notification | Vehicle state (normal stop/ driving/emergency stop, etc.)/Vehicle position(speed) | R | T | P, E | This is also used for current utilization fault check by the vehicle |
| (4) Vehicle information response | — | R | T | P, E | |
| (5) Target position - guide route Delivery | Target position, not location/permitted time to pass through the point, Maximum speed | T | R | After automated driving preparation instruction | |
| (6) Driving boundaries delivery | A group of lines to surround the permitted driving area | T | R | " | |
| (7) Automated driving start instruction | — | T | R | After delivery of guide route and driving boundaries, when restarting after emergency stop | |
| (8) Emergency stop instruction | — | T | R | " | |
| (9) Vehicle control release instruction | — | T | R | " | |

Fig. 5

SYSTEM, METHOD, INFRASTRUCTURE, AND VEHICLE FOR AUTOMATED VALET PARKING

CROSS REFERENCE TO RELATED APPLICATION

This application claims priority to and the benefit of Korean Patent Application No. 10-2018-0173420, filed on Dec. 31, 2018, the entire contents of which are incorporated herein by reference.

FIELD

The present disclosure relates to a system, method, infrastructure, and vehicle for performing automated valet parking. The present disclosure enables an unmanned vehicle to autonomously move to and park at an empty parking space.

BACKGROUND

The statements in this section merely provide background information related to the present disclosure and may not constitute prior art.

Many modern cities suffer from various problems associated with vehicle parking. For example, there is a risk of a car collision in a parking lot. For parking in crowded places such as large shopping centers, it takes long time and much energy to park a car due to traffic congestion before entering a parking lot. In addition, it takes long time and much energy to locate an empty parking slot even after entering a parking lot. In addition, there is inconvenience that a driver has to move to a spot at which his or her vehicle is parked at the time of leaving the visited area or that a driver often has difficulty in retrieving his or her vehicle due to forgetting the place where his or her vehicle is parked.

SUMMARY

The present disclosure provides an automated valet parking by which a driver can leave his or her vehicle at a predetermined drop-off zone and the vehicle autonomously moves to and parks at an empty parking space within a parking lot.

Furthermore, the automated valet parking function enables the vehicle that has been parked to autonomously move from a parking space to a predetermined pickup zone so that the driver can conveniently pick up the vehicle and leave the parking lot.

According to one aspect of the present disclosure, an automated valet parking method includes: activating an automated valet parking procedure; determining, by a parking infrastructure, a plurality of guide route candidates leading from a pickup zone to a target position; determining, by the parking infrastructure, weighting factors for the plurality of guide route candidates; selecting, by the parking infrastructure, one guide route candidates among the plurality of guide route candidates as a guide route to the target position; transmitting, by the parking infrastructure, the target position and the guide route to a vehicle; performing, by the vehicle, autonomous driving to the target position according to the guide route; performing, by the vehicle, autonomous parking at the target position; and finishing the automated valet parking procedure.

According to another aspect of the present disclosure, a device for autonomous valet parking includes a processor and a transceiver. The processor determines a target position, determine multiple guide route candidates to guide the vehicle from a pickup zone to the target position, determine weighting factors for the respective guide route candidates, select one guide route candidate from the multiple guide route candidates as a guide route by applying the weighting factors to the respective guide route candidates, and transmits the target position and the guide route that are determined to the vehicle via the transceiver.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 4A and 4B are diagrams respectively illustrating operations performed by a parking infrastructure and a vehicle for automated valet parking;

FIG. 5 is a diagram illustrating a communication process performed by a vehicle and a parking infrastructure for automated valet parking;

Figure 1:
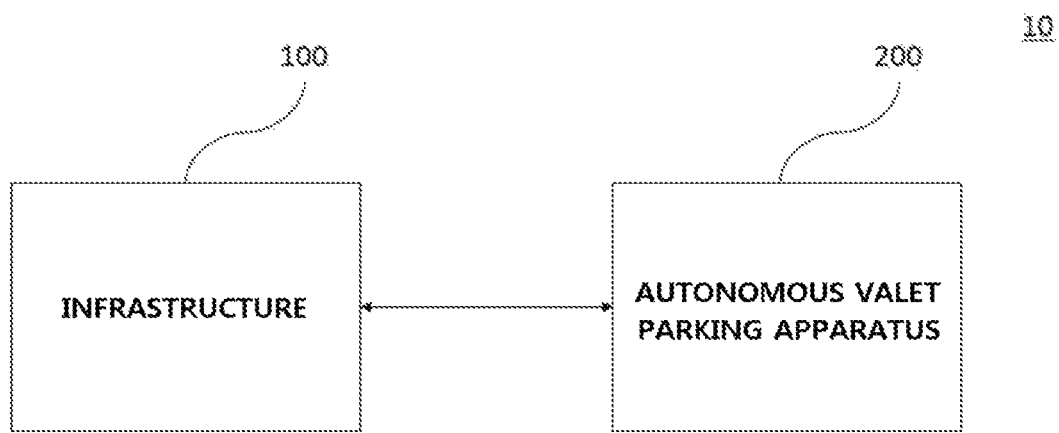
FIG. 1 is a diagram illustrating an automated valet parking system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Herein below, exemplary forms of the present disclosure will be described in detail with reference to the accompanying drawings. The construction and operational effect of the present disclosure will be clearly understood from the following detailed description. Prior to describing exemplary forms of the present disclosure in detail, it is noted that throughout the drawings the same components will be denoted by the same reference numerals when possible and a detailed description about existing components and functions is omitted when the subject matter of the present disclosure may be obscured by the description.

It is also noted that terms used in the detailed description of the present disclosure are defined below.

The term "driver" refers to a person who uses an automated valet parking service provided by an automated valet parking system.

The term "driving authority" refers to the authority to control vehicle operations. The term "vehicle operation" refers to an operation such as steering, accelerating, braking, gear shifting, vehicle starting, and door locking and unlocking of a vehicle.

The term "vehicle" refers to a vehicle having an autonomous valet parking feature.

The term "electric vehicle" refers to a vehicle that is driven by an electric motor that can be recharged in a cable plugging manner or a wireless charging manner.

The term "control center" refers to a facility that can monitor vehicles parked in a parking garage or facility, which determines a target position, a guide route, and a permitted driving area, and which transmits a driving start instruction or an emergency stop instruction to a vehicle.

The term "infrastructure" refers to a parking facility and includes sensors installed in the parking facility. Alternatively, in some cases, the term "infrastructure" may refer to a control center that controls a parking lot gate, vehicles in a parking lot, etc.

The infrastructure 100 includes a transceiver for performing communication and a processor for performing computation. According to one form, the infrastructure 100 may further include sensors for detecting nearby objects and measuring surrounding parameters. In the present disclosure, determinations and computations performed by the infrastructure 100 are performed by the processor.

The term "target position" refers to an empty space available for parking. Alternatively, the term "target position" refers to a pickup zone where a driver gets in his or her vehicle in a situation where the driver leaves the parking lot. Alternatively, the "target position" refers to a wireless-rechargeable parking slot equipped with a wireless charging system for wirelessly recharging a power source of a vehicle. For example, the target position may be a parking slot in which an electromagnetic induction coil is buried under the ground or is installed on the ground within the parking slot.

The term "guide route" refers to a route along which a vehicle drives to reach a target position. For example, at the time of parking a vehicle, the guide route is a route along which the vehicle drives until reaching an empty parking space after starting from a drop-off zone. For example, the guide route is provided in the form of instructions, for example, "driving a distance of 50 m and turning left at the next corner". The term "driving route" refers to a driving path along which a vehicle drives.

The term "permitted driving area" refers to an area where a vehicle can drive in a parking lot. For example, the permitted driving area includes the driving route. The permitted driving area is defined with barrier walls, parked vehicles, parking lines, etc.

FIG. 1 is a diagram illustrating an automated valet parking system according to one form of the present disclosure.

Referring to FIG. 1, an automated valet parking system 10 includes a parking infrastructure 100 and an autonomous valet parking apparatus 200.

The infrastructure 100 refers to a facility or system for operating, managing, and controlling an automated valet parking system. For example, the infrastructure 100 may be a parking facility. According to one form, the infrastructure 100 may include sensor, communication devices, alarm devices, display devices, and a server device that controls those devices. Alternatively, in some cases, the term "infrastructure" may refer to a control center that controls a parking lot gate, vehicles in a parking lot, etc.

The autonomous valet parking apparatus 200 refers to a vehicle that can perform autonomous valet parking. According to exemplary forms, the autonomous valet parking apparatus 200 refers to a component or a set of components capable of performing autonomous valet parking.

Figure 2:
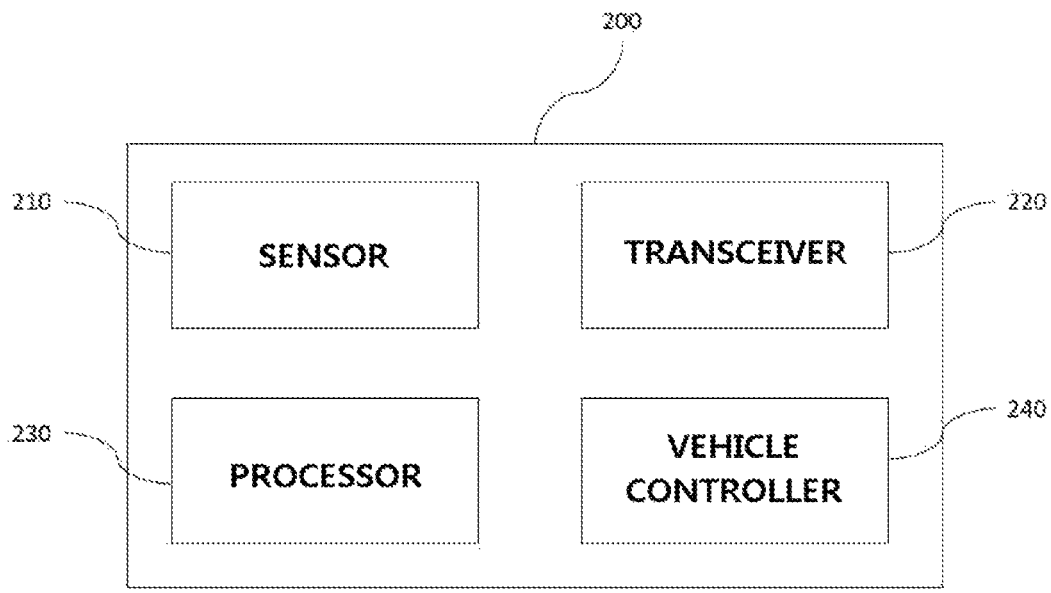
FIG. 2 is a diagram illustrating an autonomous valet parking apparatus.

FIG. 2 is a diagram illustrating an autonomous valet parking apparatus according to one form of the present disclosure. Referring to FIG. 2, the autonomous valet parking apparatus (for example, vehicle 200) includes a sensor 210, a transceiver 220, a processor 230, and a vehicle controller 240.

The sensor 210 monitors the surroundings of the autonomous valet parking apparatus 200. The sensor 210 measures the distance between the autonomous valet parking apparatus 200 and a specific object or detects a nearby object. For example, the sensor 210 includes at least one of the sensors selected from among an ultrasonic sensor, a RADAR sensor, a LIDAR sensor, a camera, an infrared sensor, a thermal sensor, and a millimeter wave sensor.

The sensor 210 transmits data obtained by the sensor to the transceiver 220 or to the vehicle controller 240.

The transceiver 220 exchanges data with the infrastructure 100. This communication is called vehicle-to-infra (V2I) communication. The transceiver 220 communicates data with other vehicles. This communication is called vehicle-to-vehicle (V2V) communication. The V2I communication and the V2V communication are collectively called vehicle-to-everything (V2X) communication. In one form, the transceiver 220 receives data such as a target position, a guide rote, a driving route, an instruction, etc. from the infrastructure 100, processes the received data, and transmits the processed data to the processor 230. The transceiver 220 transmits data collected and generated by the vehicle 200 to the infrastructure 100. The transceiver 220 exchanges data with a terminal device of the driver of the vehicle 200.

The transceiver 220 receives and transmits data by using a wireless communication protocol or a cable communication protocol. Examples of the wireless communication protocol include, but are not limited to, wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSPDA), high speed uplink packet access (HSUPA), IEEE802.16, long term evolution (LTE), long term evolution-advanced (LTE-A), wireless mobile broadband service (WMBS), Bluetooth, infrared data association (IrDA), ultra-wideband (UWB), ZigBee, near field communication (NFC), ultra sound communication (USC), visible light communication (VLC), Wi-Fi, and Wi-Fi direct. Examples of the cable communication protocol include, but are not limited to, wired local area network (LAN), wired wide area network (WAN), power line communication (PLC), USB communication, Ethernet communication, serial communication, and optical/coaxial cable communication. Other protocols that support communication between devices fall within the definition of the communication protocol that is used in the present disclosure.

The processor 230 controls the overall operation of the vehicle 200. The processor 230 controls the vehicle controller 240 on the basis of the data transmitted from the sensor 210 and the transceiver 220. The processor 230 generates a control signal for adaptively controlling the vehicle controller 240 according to the data transmitted from the infrastructure 100 and transmits the control signal to the vehicle controller 240.

That is, the processor 230 refers to a device that performs a series of computations or makes a series of determinations to control the vehicle 200 for the purpose of autonomous valet parking. For example, the processor 230 may be a processor capable of executing a software program including instructions for performing automated valet parking.

Examples of the processor 230 include a central processing unit (CPU), a microcontroller unit (MCU), an application specific integrated circuit (ASIC), a field programmable gate array (FPGA), and a graphic processing unit (GPU) but are not necessarily limited thereto.

The vehicle controller 240 controls the operation of the vehicle 200 according to the control signal issued by the processor 230. In one form, the vehicle controller 240 controls the vehicle 200 in response to the control signal transmitted from the processor 230. For example, the vehicle controller 240 controls various vehicle operations such as driving, stopping, resuming of driving, steering, accelerating, decelerating, parking, lamp lighting, alarm sounding, etc.

That is, it is to be understood that the vehicle controller 240 functions to control all kinds of operations of the vehicle 200 described herein. The vehicle controller 240 may include a driving unit, a braking unit, a steering unit, an acceleration unit, an alarm unit, and a lighting unit.

On the other hand, although not described herein, the operations and/or functions of the vehicle 200 described in the description herein are performed by the conjunction of one or more components selected from among the sensor 210, the transceiver 220, the processor 230, and the vehicle controller 240.

Figure 3:
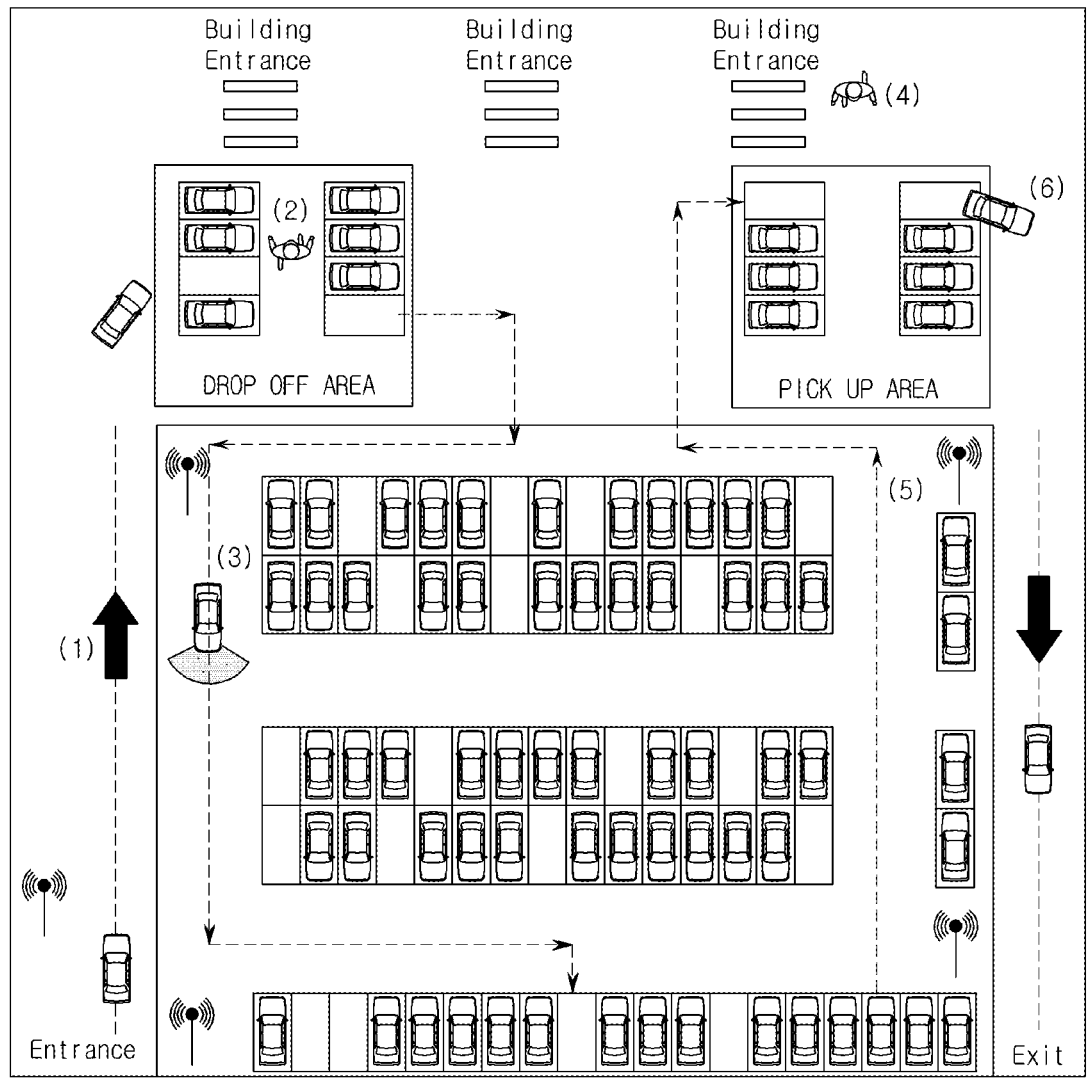
FIG. 3 is a conceptual diagram illustrating an automated valet parking system and method.

FIG. 3 is a conceptual diagram illustrating an automated valet parking system and method according to one form of the present disclosure.

Referring to FIG. 3, in step (1), a driver drives a vehicle to a drop-off zone in a parking lot.

In step (2), the drivers gets out of the vehicle at the drop-off area and the authority to drive or control the vehicle is delegated to the infrastructure.

In step (3), the infrastructure searches for an empty parking slot and assigns a suitable empty parking space to the vehicle. The infrastructure determines a guide route leading to the assigned empty parking space. After the parking space and the guide route are determined, the vehicle autonomously drives along the guide route to reach the parking space and performs autonomous parking at the parking space.

In step (4), the driver makes a pickup request and moves to a pickup zone where the vehicle will be returned to the driver.

In step (5), the infrastructure determines a suitable target position. For example, the suitable target position may be an empty parking slot of multiple parking slots within the pickup zone. In addition, the infrastructure determines a guide route which will guide the vehicle to the target position. After the target position and the guide route are determined and transmitted to the vehicle, the vehicle autonomously drives along the guide route to reach the target position and performs autonomous parking at the target position.

In step (6), the driver arrives at the pickup zone and takes over the authority to control the vehicle. The driver drives the vehicle toward the exit of the parking lot.

FIGS. 4A and 4B are diagrams illustrating operations performed by a parking infrastructure and a vehicle for automated valet parking, according to one form of the present disclosure.

In step (1), operations of the infrastructure and the vehicle to start an automated valet parking procedure are performed. The infrastructure identifies a driver and a vehicle and determines whether the driver and the vehicle are qualified. For example, the infrastructure determines whether the driver is a qualified driver by reading an identification number (ID) or a password input by the driver. In addition, the infrastructure determines whether the vehicle is a qualified vehicle by reading to a vehicle identification number of the vehicle. The vehicle can turn on and off the engine by itself. The vehicle can turn on and off a power supply by itself. For example, a state in which the engine of the vehicle is turned off and the power supply is turned on is referred to as an accessory-on (ACC-On) state. The engine on/off and the power supply on/off of the vehicle are performed according to instructions transmitted from the infrastructure or automatically performed without depending on the instructions transmitted from the infrastructure. The vehicle can lock/unlock the doors by itself. The locking/unlocking of the vehicle doors is performed according to instructions transmitted from the infrastructure or is automatically performed without depending on the instructions from the infrastructure. When the vehicle proceeds to an autonomous parking step, the vehicle doors may be locked. In addition, the authority to drive the vehicle is delegated to the infrastructure from the vehicle. The driving authority means an authority to control vehicle operations. The vehicle operations include steering, accelerating, braking, gear shifting, ignition turning, and door locking and unlocking. Since the driving authority is delegated to the infrastructure, the infrastructure takes complete control of the vehicle during the automated valet parking of the vehicle. Accordingly, it is possible to lower a risk that unintended vehicle operations occur and to prevent vehicle accidents in the parking lot. However, in some cases, the driving authority may be partially delegated to the infrastructure so that the vehicle can still control some of the vehicle operations, or the driving authority may be shared by the vehicle and the infrastructure. For example, a braking operation may be performed when an emergency occurs during the autonomous valet parking procedure. Therefore, the vehicle may apply a brake without intervention of the infrastructure when the vehicle senses a danger with help of an ADAS sensor. In addition, the vehicle checks whether a person or animal is present in the vehicle. Since a parking duration from the completion of the autonomous valet parking to the discharging of the vehicle from a parking lot is long, if a person or animal is accidently left in the vehicle, the person or animal would be in danger. Therefore, it is desired to make sure that the vehicle is empty before the vehicle is parked. Whether a person or animal is present in the vehicle is checked with a sensor mounted in the vehicle.

In step (2), a process of determining a target position, a guide route, and a driving route is performed. The determination of the target position, the guide route, and the driving route is performed by the infrastructure. The target position, the guide route, and the driving route determined by the infrastructure are delivered from the infrastructure to the vehicle.

The target position is a final destination to be reached by the vehicle. In a case where a vehicle enters a parking lot, the target position may be an empty parking slot in a parking zone of the parking lot. In a case where a vehicle exits a parking lot, the target position may be an empty parking slot in the pickup zone of the parking lot. Alternatively, the target position may be a specific spot in the vicinity of an empty parking slot. For example, when there are several successive empty parking slots in a specific area of the parking lot, the target position may be a specific spot in the vicinity of the specific area having the empty parking slots. In this case, the vehicle autonomously drives to the specific spot, and the autonomous parking function of the advanced driver-assistance system (ADAS) mounted in the vehicle is activated so that the vehicle can be parked in a desired parking slot in the vicinity of the specific spot. The autonomous parking function of the ADAS may be a partially automated parking system (PAPS). In this case, the efficiency of management of available parking spaces can be improved. In this case, it is not necessary for the infrastructure to accurately calculate the target position. That is, only rough estimation for the target position is desired. Therefore, it is possible to reduce computing resources for data processing.

The guide route is a path along which the vehicle needs to autonomously drive in the parking lot. The guide route is provided to the vehicle in the form of a series of instructions, such as driving 10 meters straight forward, turning right at the corner, driving 20 meters straight forward, turning left, etc. Alternatively, the guide route is provided to the vehicle in the form of lines including straight lines and curved lines drawn on a parking lot map. The lines indicate a driving lane extending from the current location of the vehicle to the target position on the parking lot map. Alternatively, the guide route is composed of multiple waypoints and one target position marked on a parking lot map. For example, the guide route includes three pillars A1, B2, and C3 as the multiple waypoints and a parking slot D23 as the target position. When the guide route is expressed in the form of multiple waypoints and a target position, information on straight and/or curved lines and distances (for example, 10 m) is not required. Therefore, this guide route reduces the amount of information for V2I communication.

In step (3), an autonomous driving operation of the vehicle is performed in the parking lot. The autonomous driving of the vehicle includes driving, stopping, and resuming driving. The autonomous driving of the vehicle is performed according to instructions transmitted from the infrastructure to the vehicle. Alternatively, the autonomous driving of the vehicle may be performed without relying on the instructions transmitted from the infrastructure. The vehicle can autonomously drive to the target position along the guide route within a permitted driving area. During the driverless autonomous driving of the vehicle, the vehicle is controlled to drive at a preset speed or below. This preset speed may be a value transmitted from the infrastructure to the vehicle or may be a value stored in the vehicle. In addition, the vehicle is controlled not to deviate beyond an error margin from the given guide route when driving along the guide route. This preset error margin may be a value transmitted from the infrastructure to the vehicle or may be a value stored in the vehicle. In addition, the vehicle may turn with a predetermined minimum turning radius when it is desired to turn during the autonomous driving along the guide route. This preset minimum turning radius may be a value transmitted from the infrastructure to the vehicle or may be a value stored in the vehicle. The vehicle is controlled not to exceed a predetermined maximum acceleration when autonomously driving along the guide route. This preset maximum acceleration value may be a value transmitted from the infrastructure to the vehicle or may be a value stored in the vehicle.

In step (4), a position measurement operation is performed. The target of the position measurement may be a vehicle to be parked in a parking lot, an obstacle existing in the parking lot, or a vehicle that is already parked in the parking lot. The infrastructure measures the position of the vehicle or the obstacle and stores the measured position in a database. The infrastructure identifies and detects vehicles or obstacles and monitors the safety of each of the plurality of vehicles in the parking lot. In addition, the infrastructure monitors the operating state of the vehicle that is performing autonomous parking after reaching the target position and transmits an instruction on the basis of the results of the monitoring. The vehicle measures its position on its own. The vehicle transmits the measured position to the infrastructure. The error of the position measured by the vehicle needs to be within a predetermined error range. The predetermined error range is determined by the infrastructure. The vehicle detects obstacles present around the vehicle, measures the positions of the obstacles, and transmits the measured positions of the respective obstacles to the infrastructure. The communication between the vehicle and the infrastructure is performed at a predetermined frequency.

In step (5), an autonomous parking operation is performed by the vehicle. The autonomous parking refers to an operation in which the vehicle reaches around the target position and driverlessly goes into a target parking slot. The vehicle performs autonomous parking by sensing nearby obstacles or nearly vehicles that are parked, with the help of a distance sensor mounted on the vehicle. Examples of the distance sensor mounted on the vehicle include an ultrasonic sensor, a RADAR sensor, a LIDAR sensor, and a camera.

In step (6), an emergency braking operation is performed. The emergency braking of the vehicle is performed according to instructions transmitted from the infrastructure or may be performed on its own when the vehicle detects an obstacle. The infrastructure instructs the vehicle to apply an emergency brake when it is determined that an area around the vehicle is unsafe. When the infrastructure determines that the surroundings of the vehicle become safe after the emergency braking is performed, the infrastructure orders the vehicle to resume autonomous driving or autonomous parking. When the vehicle detects an obstacle, the vehicle applies an emergency brake on its own. In addition, the vehicle reports to the infrastructure on the emergency braking or the type or location of an obstacle which is the cause of the emergency braking. The vehicle reduces its speed according to a predetermined deceleration value preset for the emergency braking. This predetermined deceleration value is a value determined by the infrastructure or a value stored in the vehicle. The predetermined deceleration value may be determined according to the type of an obstacle, the position of an obstacle, and the distance between the vehicle and an obstacle. The vehicle resumes autonomous driving or autonomous parking upon receiving a resumption instruction for the autonomous driving or autonomous parking from the infrastructure. Alternatively, the vehicle may resume the autonomous driving or autonomous parking when it confirms that the obstacle is removed. The vehicle reports to the infrastructure of the resumption of autonomous driving or autonomous parking and of the removal of the obstacle.

In step (7), the automated valet parking procedure is finished. After the vehicle has completed autonomous driving and autonomous parking, the infrastructure facility issues a control release command to the vehicle. The vehicle can turn on and off the engine and turn on and off the power supply according to instructions received from the infrastructure or without depending on the instructions from the infrastructure. In addition, the vehicle can lock and unlock the vehicle doors according to instructions received from the infrastructure or without depending on the instructions from the infrastructure. Further, the vehicle can apply a parking brake according to instructions received from the infrastructure or without depending on the instructions from the infrastructure.

In step (8), an error control operation is performed. The error control is performed when an error occurs in communication between the vehicle and the infrastructure and/or when a mechanical error of the vehicle occurs. The infrastructure monitors communication between the infrastructure and the vehicle to detect whether a communication error occurs. The vehicle detects a communication error by monitoring the communication between the infrastructure and the vehicle. The vehicle detects whether a mechanical operation error occurs by monitoring operating states of built-in accessories including a sensor mounted thereon. The vehicle detects the presence of a person or animal in the vehicle and applies an emergency brake when the presence of a person or animal is detected. The vehicle resumes autonomous parking or autonomous driving according to instructions received from the infrastructure when the vehicle is in an emergency stop state. Alternatively, the vehicle may determine, by itself, whether the cause of the emergency braking is removed and resumes autonomous parking or autonomous driving when the cause of the emergency parking is removed.

FIG. 5 is a diagram illustrating a communication process performed by a vehicle and a parking infrastructure for automated valet parking according to one form of the present disclosure.

In step (1), vehicle qualification information is delivered from the vehicle to the infrastructure. The vehicle qualification information includes an identifier that distinguishes each vehicle from the other vehicles. For example, the vehicle qualification information may be a unique vehicle number (for example, license plate number) of the vehicle. The vehicle qualification information is transmitted at a stage in which the autonomous valet parking procedure is started after the vehicle enters a parking lot and (see (1) of FIG. 4A).

In step (2), an autonomous valet parking preparation instruction is transmitted from the infrastructure to the vehicle. The autonomous valet parking preparation instruction is transmitted before the autonomous driving of the vehicle begins.

In step (3), vehicle information is transmitted from the vehicle to the infrastructure. The vehicle information includes state information of the vehicle and position information of the vehicle. The state information of the vehicle includes whether the vehicle is driving, whether the vehicle is stopped, or whether the vehicle is in an emergency stop state. The vehicle information is transmitted periodically at a specific frequency (for example, 1 Hz which means once per second). The vehicle information is used as a parameter to determine whether a communication error has occurred between the vehicle and the infrastructure. For example, when the vehicle information does not reach the infrastructure at a specific time that is estimated according to the communication frequency, the infrastructure determines that an error has occurred in communication between the vehicle and the infrastructure.

In step (4), an acknowledgement of the reception of the vehicle information is transmitted from the infrastructure to the vehicle. The acknowledgement of the reception of the vehicle information is transmitted at the same frequency as the transmission of the vehicle information that is transmitted in step (3). Therefore, the acknowledgement of the reception of the vehicle information is used as a parameter to determine whether an error has occurred in communication between the vehicle and the infrastructure. For example, when the vehicle information does not reach the infrastructure at a specific time that is estimated according to the communication frequency, the infrastructure determines that an error has occurred in communication between the vehicle and the infrastructure.

In step (5), a target position and a guide route are delivered from the infrastructure to the vehicle. The delivery of the target position and the guide route may be performed either before or after an autonomous valet parking start instruction is transmitted from the infrastructure to the vehicle.

In step (6), driving area boundary information is transmitted to the vehicle from the infrastructure. The driving area boundary information includes landmarks (for examples, lines demarcating parking slots, a central line, and lane boundary lines demarcating a driving lane) that mark the boundaries of a permitted driving area. The transmission of the driving area boundary information is performed after the autonomous valet parking preparation instruction is delivered. This driving area boundary information is transmitted from the infrastructure to the vehicle in the form of a parking lot map.

In step (7), the autonomous valet parking start instruction is transmitted from the infrastructure to the vehicle. The transmission of the autonomous valet parking start instruction is performed after the guide route and the driving area boundary information are delivered. Alternatively, the autonomous valet parking start instruction is transmitted when the cause of the emergency braking is removed.

In step (8), an emergency braking instruction is transmitted to the vehicle from the infrastructure.

In step (9), a vehicle control release instruction is transmitted to the vehicle from the infrastructure. The delivery of the vehicle control release instruction is performed after the vehicle is autonomously parked at a parking slot.

Figure 6:
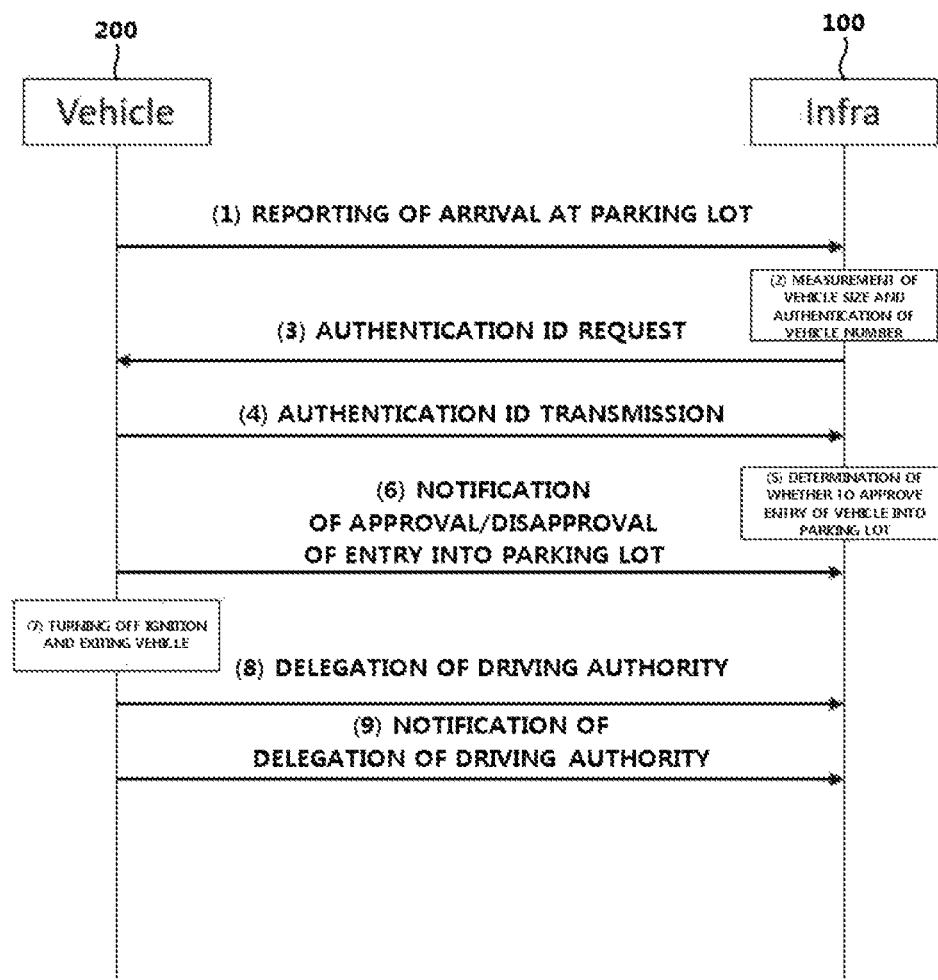
FIG. 6 is a diagram illustrating a communication process performed by a vehicle and a parking infrastructure for automated valet parking.

FIG. 6 is a diagram illustrating a communication process performed between a parking infrastructure 100 for automated valet parking and a vehicle 200.

In step (1), the vehicle 200 enters a parking lot and stops at a predetermined stop position. This stop position may be an entrance gate of the parking lot. The vehicle 200 reports its arrival to the infrastructure 100. In step (2), the infrastructure 100 measures the dimensions of the vehicle 200 and authenticates the vehicle 200 on the basis of an authentication ID of the vehicle 200. In step (3), the infrastructure 100 transmits an authentication ID submission request to the vehicle 200. In step (4), the vehicle 200 transmits the authentication ID to the infrastructure 100. In step (5), the infrastructure 100 determines whether to allow entry of the vehicle 200 into the parking lot on the basis of the received authentication ID. In step (6), the infrastructure 100 notifies the vehicle whether the vehicle 200 is permitted to enter the parking lot according to the authentication result of the received authentication ID. For example, the infrastructure 100 displays a message indicating approval or disapproval of the entry of the vehicle into the parking lot on a display panel installed around the stop position. The driver drives the vehicle 200 to a drop-off zone when the entry of the vehicle into the parking lot is approved. In step (7), the driver turns off the ignition of the vehicle 200, gets out of the vehicle 200, locks the vehicle doors, and leaves the drop-off zone. In step (8), the authority to drive the vehicle 200 is delegated from the vehicle 200 (or the driver) to the infrastructure 100. In addition, in step (9), the infrastructure 100 notifies the driver that it takes the authority to control the vehicle 200 in the parking lot. Such a notification may be sent to a driver's smart device through a mobile communication network.

Figure 7:
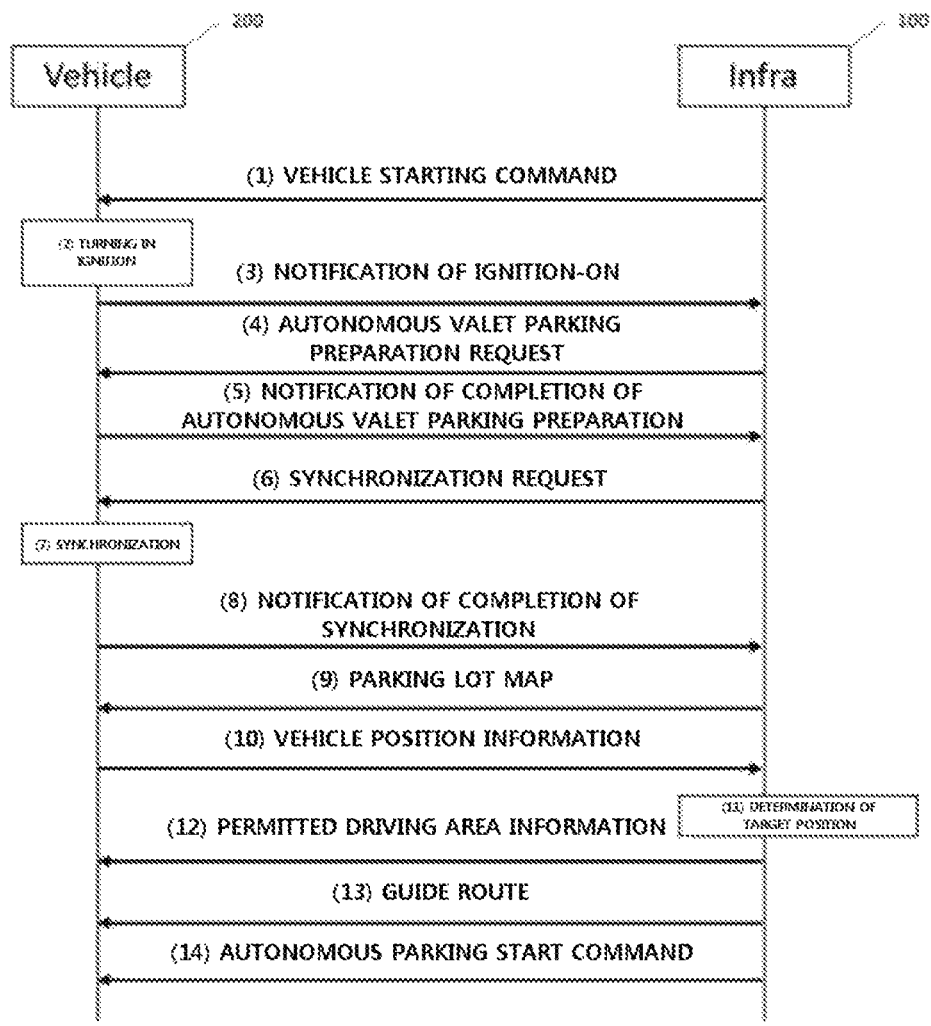
FIG. 7 is a diagram illustrating a communication process performed by a vehicle and a parking infrastructure for automated valet parking.

FIG. 7 is a diagram illustrating a communication process performed between a parking infrastructure 100 for automated valet parking and a vehicle 200.

In step (1), the infrastructure 100 transmits an ignition turning-on request to the vehicle 200. In step (2), the vehicle 200 turns on the ignition according to the ignition turning-on request transmitted from the infrastructure 100. In step (3), the vehicle 200 turns on the ignition and then notifies the infrastructure 100 that the ignition is turned on. In step (4), the infrastructure 100 transmits an automated valet parking preparation request to the vehicle 200. In step (5), the vehicle 200 transmits a reply to the automated valet parking preparation request to the infrastructure 100. The reply is a message of OK indicating that the preparation for automated valet parking is completed or a message of NG indicating that the preparation for automated valet parking is not completed. In step (6), the infrastructure 100 transmits a synchronization request to the vehicle 200. The synchronization request is a request for instructing synchronization of time such that the timer of the infrastructure 100 is synchronized with the timer of the vehicle 200. For example, the synchronization request includes information about time indicated by the timer of the infrastructure 100. In step (7), the vehicle 200 performs the synchronization according to the synchronization request. In step (8), the vehicle 200 transmits a reply indicating that the synchronization is completed to the infrastructure 100. For example, until the synchronization between the infrastructure 100 and the vehicle 200 is completed, a plurality of synchronization requests may be transmitted from the infrastructure 100 to the vehicle 200. In step (9), the infrastructure 100 transmits parking lot map information to the vehicle 200. The parking lot map information includes landmark information. In step (10), the vehicle 200 estimates or calculates the position of the vehicle 200 on the basis of the transmitted landmark information, and the vehicle 200 transmits the estimated position of the vehicle 200 to the infrastructure 100. In step (11), the infrastructure 100 determines a target position (for example, parking position). In step (12), the infrastructure 100 transmits information on a permitted driving area to the vehicle 200. For example, the infrastructure 100 transmits boundary information of the permitted driving area to the vehicle 200. In step (13), the infrastructure 100 transmits a guide route to the vehicle 200. In step (14), the infrastructure 100 transmits an automated valet parking start instruction to the vehicle 200.

Figure 8:
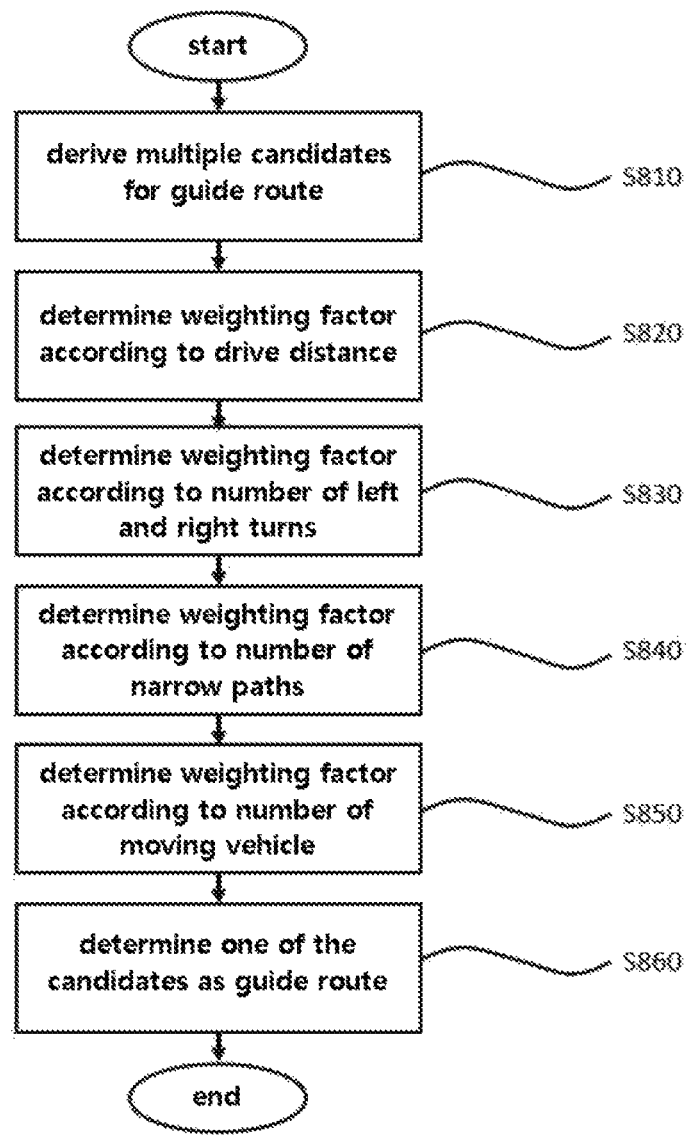
FIG. 8 is a diagram illustrating a method of determining a guide route.

FIG. 8 is a diagram illustrating a method of determining a guide route according to one form of the present disclosure.

Figure 9:
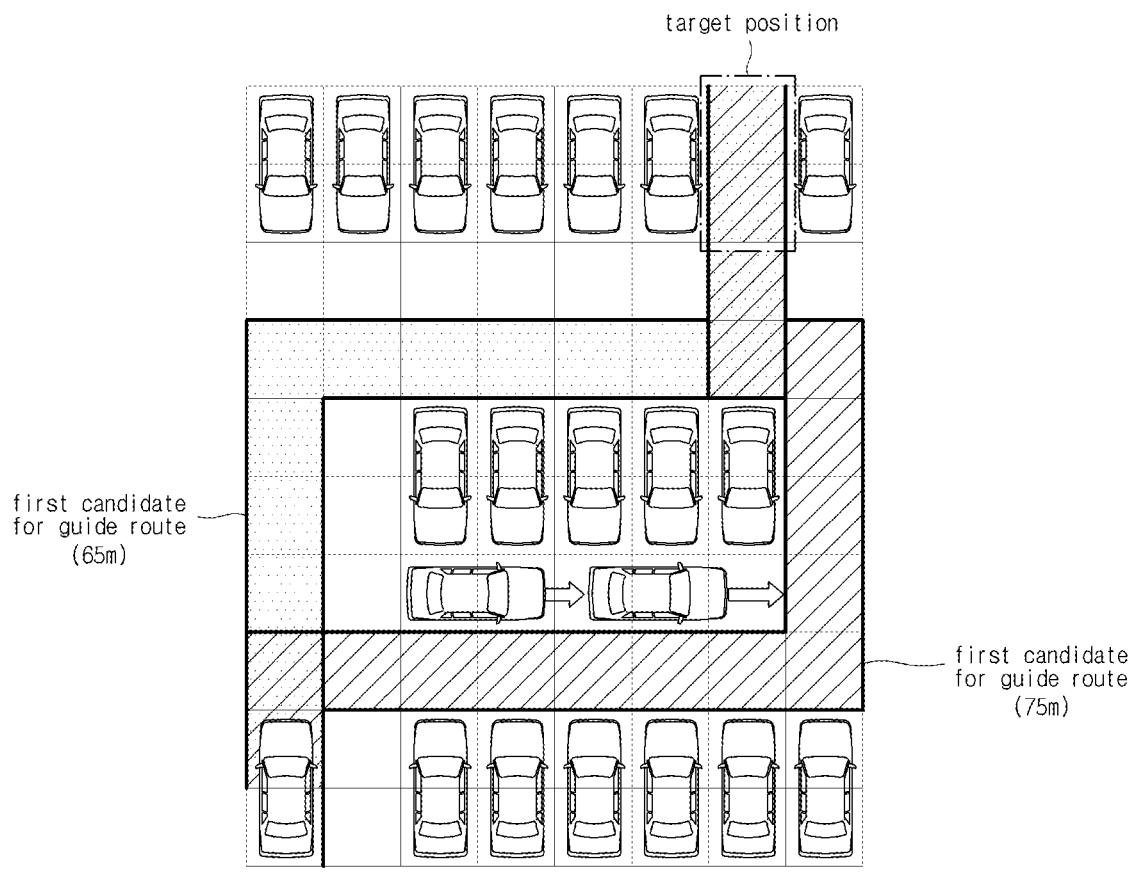
FIG. 9 is a diagram illustrating a method of determining a plurality of guide route candidates and a method of determining length-based weighting factors for the respective guide route candidates.

FIG. 9 is a diagram illustrating a method of determining a plurality of guide route candidates and a process of determining length-based weighting factors for the respective guide route candidates, according to one form of the present disclosure.

Figure 10:
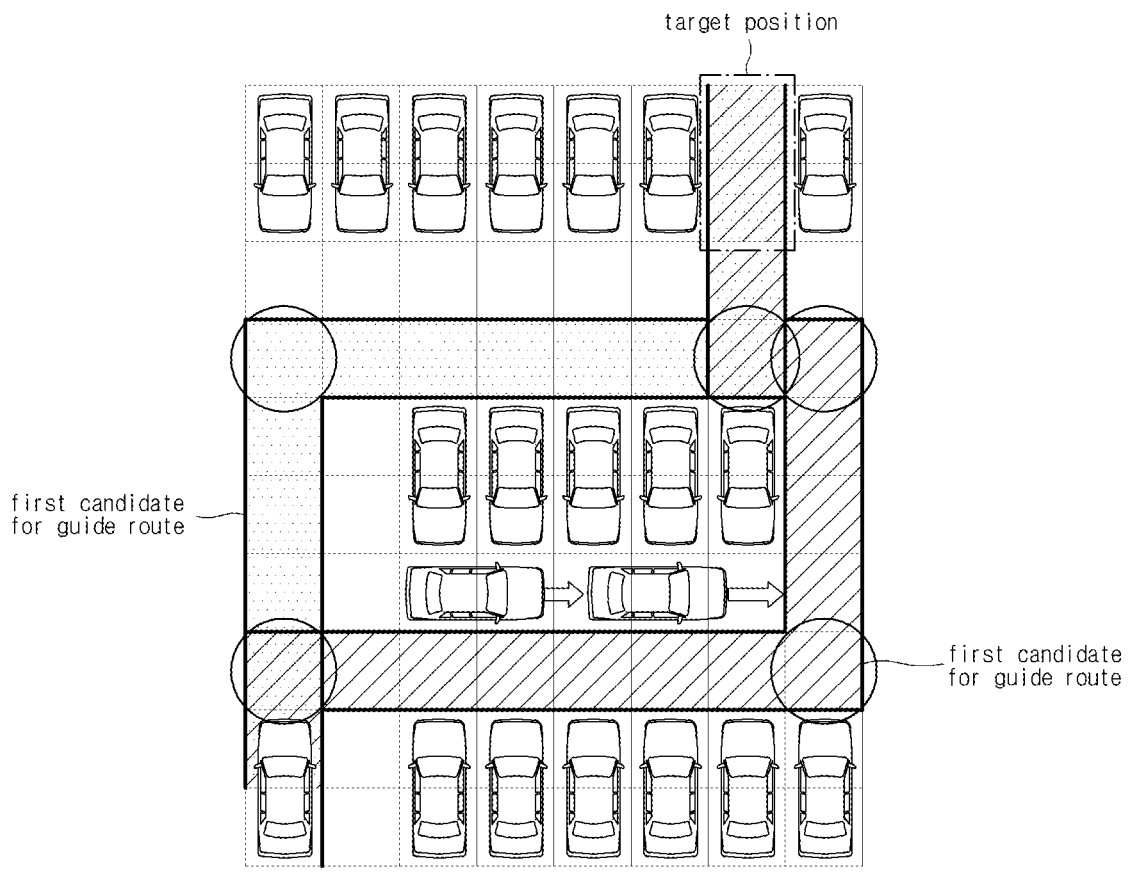
FIG. 10 is a diagram illustrating a method of determining weighing factors according to the number of left turns and right turns.

FIG. 10 is a diagram illustrating a method of determining weighing factors according to the number of left turns and right turns, according to another form of the present disclosure.

Figure 11:
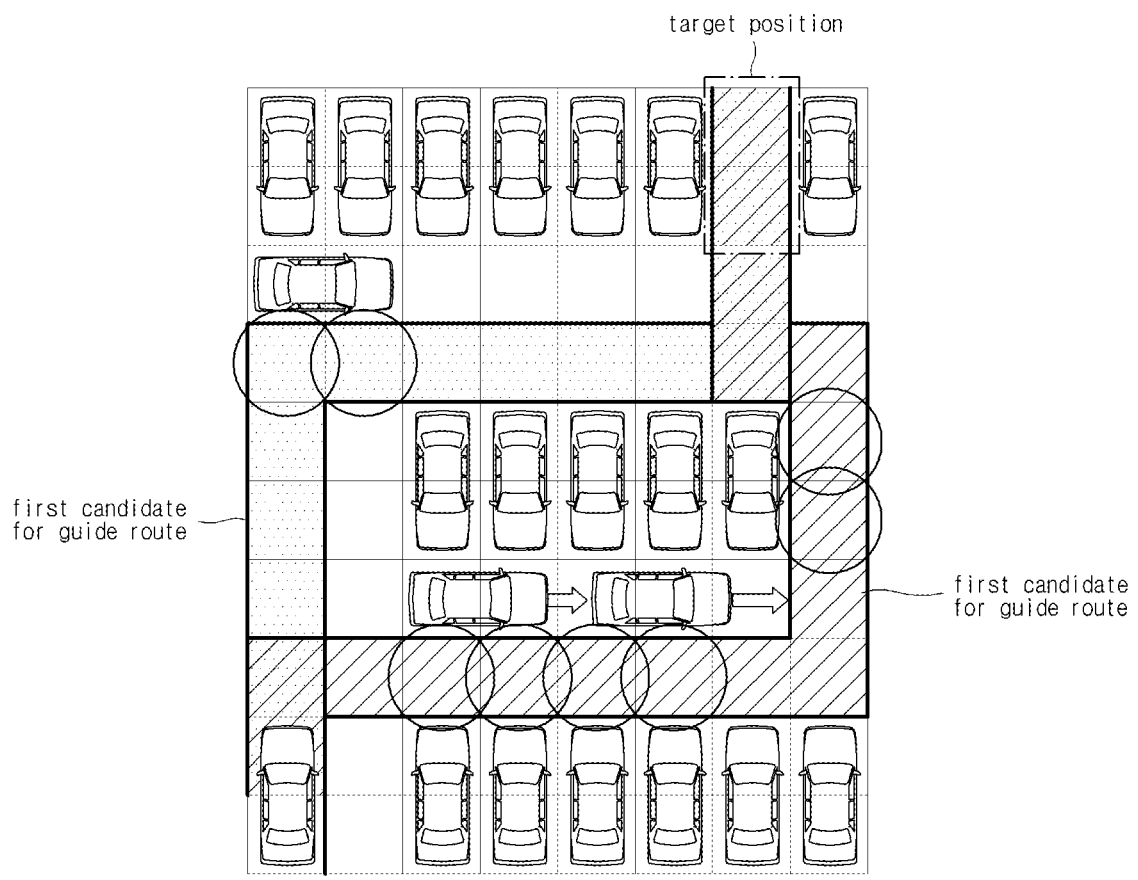
FIG. 11 is a diagram illustrating a method of determining weighting factors according to the number of narrow paths.

FIG. 11 is a diagram illustrating a method of determining weighting factors according to the number of narrow paths, according to one form of the present disclosure.

Figure 12:
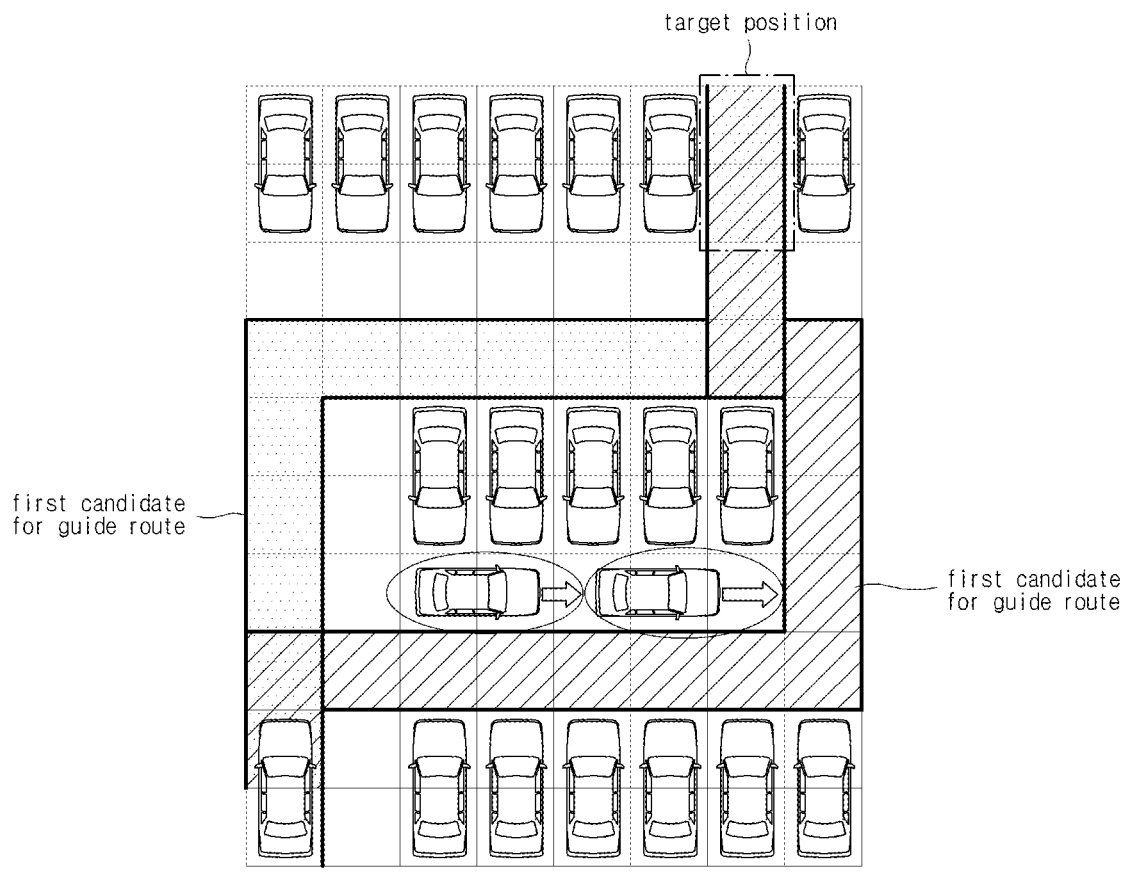
FIG. 12 is a diagram illustrating a method of determining weighting factors according to the number of moving vehicles.

FIG. 12 is a diagram illustrating a method of determining weighting factors according to the number of moving vehicles, according to one form of the present disclosure.

Referring to FIGS. 8 and 9 through 12, a method of determining a guide route according to one form of the present disclosure will be described.

Referring to FIG. 8, a plurality of guide route candidates is calculated in step S810.

Referring to FIG. 9, two guide route candidates are calculated so that a vehicle is guided from a current location to a target position. Of the two guide route candidates, a section denoted by splashes and a section denoted by oblique lines in FIG. 9 are respectively conveniently referred to as a first guide route candidate and a second guide route candidate. The infrastructure holds a high resolution parking lot map and information on vehicles which are currently driving to their target positions to perform autonomous valet parking and vehicles which are already parked in the parking lot. The infrastructure can derive multiple guide route candidates capable of guiding the vehicle from the current location to the target position on the basis of the parking lot map information and the vehicle information.

Referring to FIG. 8, weighting factors for the respective guide route candidates are determined on the basis of the drive distances along the respective guide route candidates in step S820. For example, when the vehicle moves along the first guide route candidate, the vehicle need to drive a total distance of 60 m to reach the target position from the current location. On the other hand, when the vehicle moves along the second guide route candidate, the vehicle needs to drive a total distance of 75 m to reach the target position from the current location. When performing autonomous driving to reach the target position at which the autonomous valet parking is to be performed, an error between a planned drive path and an actual drive path increases with the increase of the distance to the target position due to other vehicles and obstacles which are likely to be present on the drive path or due to the surrounding environment of the vehicle. Therefore, according to the present disclosure, weighting factors based on the drive distances along the respective guide route candidates are applied to determine a final guide route.

In the present form in which the weighting factors to be applied to the respective guide route candidates are determined according to the drive distances along the guide route candidates, a guide route candidate having the shortest drive distance among the multiple guide route candidates is determined as a final guide route. For example, in a case where a guide route candidate with a lower score to which a smaller weighting factor is applied is determined as the guide route, a first guide route candidate having a shorter drive distance to the target position is allocated a smaller weighting factor than a second guide route candidate having a longer drive distance to the target position. For example, when drive distance-based weighting factors are applied to the respective guide route candidates, the weighting factor for the first guide route candidate is calculated as (the drive distance of the first guide route candidate)/(the sum of the drive distance of the first guide route candidate and the drive distance of the second guide route candidate). In the form illustrated in FIG. 10, the distance-based weighting factor for the first guide route candidate is calculated as 60/(60+75), and the distance-based weighting factor for the second guide route candidate is calculated as 75/(60+75). The score of the first guide route to which the distance-based weighting factor is applied is calculated as 60*60/135 which is equal to about 26.67 and the score of the second guide route to which the distance-based weighting factor is applied is calculated as 75*75/135 which is equal to about 41.67. In this form, a guide route candidate having a lower score is finally determined as a guide route to be used. Therefore, the first guide route candidate is finally determined as the guide route.

Alternatively, a guide route candidate having a higher score may be finally determined as a guide route to be used.

Referring to FIG. 8, weighting factors for the respective guide route candidates are determined on the basis of the number of left/right turns that are present on the drive path to the target position in step S830. Referring to FIG. 10, the number of left and right turns on the drive path along a first guide route candidate is two and the number of left and right turns on the drive path along a second guide route candidate is four. When autonomous driving to reach a target parking space is performed, interference in position recognition mostly occurs due to a high yaw rate which occurs during left turns or right turns. That is, unanticipated events are highly likely to occur during left or right turns. Therefore, according to the present disclosure, weighting factors applied to respective guide route candidates may be determined according to the number of left and right turns on the drive path.

In this case, i.e., when weighting factors are determined according to the number of left and right turns on the drive path, a guide route candidate having the smallest number of left/right turns on the drive path thereof is finally determined as a guide route. For example, in a case where a guide route candidate with the lowest score to which the smallest weighting factor is applied is determined as the guide route, a first guide route candidate having a smaller number of left and right turns on the drive path thereof may be allocated a smaller weighting factor than a second guide route candidate having a larger number of left and right turns on the drive path thereof. For example, when turn count-based weighting factors are applied to the respective guide route candidates, the weighting factor for the first guide route candidate is calculated as (the number of left and right turns on the drive path of the first guide route)/(the sum of the number of left and right turns on the drive path of the first guide route and the number of left and right turns on the drive path of the second guide route). In the form illustrated in FIG. 9, the turn count-based weighting factor for the first guide route candidate is calculated as 2/(2+4), and the turn count-based weighting factor for the second guide route candidate is calculated as 4/(2+4).

The weighting factors may be determined according to a combination of multiple parameters or a single parameter. That is, the guide route may be determined by applying all kinds of the weighting factors or one kind of the weighting factors suggested in the present disclosure.

In order to determine the guide route, the scores of the guide route candidates may be calculated by applying, in combination, the distance-based weighting factor illustrated in FIG. 9 and the turn count-based weighting factor illustrated in FIG. 10. That is, the score of the first guide route candidate is calculated as 26.67*2/6 (i.e., about 8.89) and the score of the second guide route candidate is calculated as 41.67*4/6 (i.e., about 27.78). In this form, since a guide route candidate having a lower score is finally determined as a guide route to be used, the first guide route candidate is finally determined as the guide route.

Alternatively, when a guide route candidate having a higher score is finally determined as a guide route, the second guide route candidate may be determined as the guide route.

Referring to FIG. 8, weighting factors for the respective guide route candidates are determined on the basis of the number of narrow paths included in a guide route candidates in step S840. Referring to FIG. 11, a narrow path occurs in two blocks on the first guide route candidate and in six blocks on the second guide route candidate. When performing autonomous driving to reach the target parking place for the purpose of automated valet parking, a relatively narrow path entails more computations and has a higher probability of car collision. Therefore, according to the present disclosure, weighting factors applied to respective guide route candidates may be determined according to the number of narrow paths passed by the vehicle.

In the present disclosure, the term "narrow path" is defined as a path smaller in width than a reference value. When narrow path count-based weighting factors are applied, a guide route candidate having a smaller number of narrow paths is finally determined as a guide route. For example, in a case where a guide route candidate with the lowest score to which the smallest weighting factor is applied, among the multiple guide route candidates, is finally determined as the guide route, a first guide route candidate having a smaller number of narrow paths may be allocated a smaller weighting factor than a second guide route candidate having a larger number of narrow paths. For example, the narrow path count-based weighting factor for the first guide route candidate is calculated as (the number of narrow paths on the first guide route)/(the sum of the number of narrow paths on the first guide route and the number of narrow paths on the second guide route). In the form illustrated in FIG. 11, the narrow path count-based weighting factor for the first guide route candidate is calculated as 2/(2+6), and the narrow path count-based weighting factor for the second guide route candidate is calculated as 6/(2+6).

The weighting factors may be determined according to a combination of multiple parameters or a single parameter. That is, the guide route may be determined by applying all kinds of the weighting factors or one kind of the weighting factors suggested in the present disclosure.

In order to determine the guide route, the scores of the guide route candidates may be calculated by applying, in combination, the distance-based weighting factor illustrated in FIG. 9, the turn count-based weighting factor illustrated in FIG. 10, and the narrow path count-based weighting factor illustrated in FIG. 11. That is, the score of the first guide route candidate is calculated as 8.89*2/8 (i.e., about 2.22) and the score of the second guide route candidate is calculated as 27.78*6/8 (i.e., about 20.84). In this form, since a guide route candidate having a lower score is finally determined as a guide route to be used, the first guide route candidate is finally determined as the guide route.

Alternatively, when a guide route candidate having a higher score is finally determined as a guide route, the second guide route candidate may be determined as the guide route.

In the present form, the reference value to determine the narrow path may be adaptively determined according to the length and width of the vehicle to perform autonomous driving. For example, the reference value to determine the narrow path for a smaller car may be smaller than that for a larger car.

Referring to FIG. 8, weighting factors for respective guide route candidates are determined on the basis of the number of moving vehicles on each of the guide route candidates in step S850. Referring to FIG. 12, the number of moving vehicles on the first guide route candidate is zero and the number of moving vehicles on the second guide route candidate is two. When performing autonomous driving to reach the target parking place for the purpose of automated valet parking, a risk of a car collision depends on moving vehicles, obstacles, and nearby objects on a drive path. Therefore, according to the present disclosure, weighting factors for respective guide route candidates are determined according to the number of moving vehicles.

In the present disclosure, the moving vehicles refer to vehicles that are autonomously driving on or in the vicinity of a guide route. In a case where the weighting factors are determined according to the number of moving vehicles, a guide route candidate on or in the vicinity thereof a smaller number of moving vehicle are present may be finally determined as a guide route. For example, in a case where a guide route candidate with the lowest score to which the smallest weighting factor is applied is determined as the guide route, a first guide route candidate having a smaller number of moving vehicles present thereon may be allocated a smaller weighting factor than a second guide route candidate having a larger number of moving vehicles present thereon. For example, the moving vehicle count-based weighting factor for the first guide route candidate is calculated as (the number of moving vehicles on the first guide route)/(the sum of the number of moving vehicles on the first guide route and the number of moving vehicles on the second guide route). However, when the number of moving vehicles on a guide route candidate (for example, the first guide route candidate in the form) is zero, a default value of 1 or 2 may be added. When this applies to the present form, a weighting factor for the first guide route candidate is calculated as (default value+number of moving vehicles on first guide route candidate)/(default value+number of moving vehicles on first guide route candidate+number of moving vehicles on second guide route candidate). In the form illustrated in FIG. 12, the moving vehicle count-based weighting factor for the first guide route candidate is calculated as 1/(1+0+2), and the moving vehicle count-based weighting factor for the second guide route candidate is calculated as 2/(1+0+2).

The weighting factors may be determined according to a combination of multiple parameters or a single parameter. That is, the guide route may be determined by applying all kinds of the weighting factors or one kind of the weighting factors suggested in the present disclosure.

In order to determine the guide route, the scores of the guide route candidates may be calculated by applying, in combination, the distance-based weighting factor illustrated in FIG. 9, the turn count-based weighting factor illustrated in FIG. 10, the narrow path count-based weighting factor illustrated in FIG. 11, and the moving vehicle count-based weighting factor illustrated in FIG. 12. That is, the score of the first guide route candidate is calculated as 2.22*⅓ (i.e., about 0.74) and the score of the second guide route candidate is calculated as 20.84*⅔ (i.e., about 13.89). In this form, since a guide route candidate having a lower score is finally determined as a guide route to be used, the first guide route candidate is finally determined as the guide route.

Alternatively, when a guide route candidate having a higher score is finally determined as a guide route, the second guide route candidate may be determined as the guide route.

Referring to FIG. 8, one of guide route candidates is determined as the guide route as described above in step S860.

In one or more exemplary forms, the described functions may be implemented in the form of hardware, software, firmware, or any combination thereof. When implemented in the form of software, these functions may be stored on or transmitted to a computer-readable medium in the form of one or more instructions or codes. The computer-readable medium refers to any medium that can transfer a computer program from one computer to another. For example, it may be a communication medium or a computer-readable storage medium. The storage medium may be an arbitrary medium that can be accessed by a computer. The computer-readable media include, not limitedly, RAMS, ROMs, EEPROMs, optical discs such as CD-ROM, magnetic disks, and any media that can be accessed by computers and which can be used to transfer a computer program in the form of instructions from one place to another. The computer-readable media are appropriately referred to as media that can be arbitrarily accessed by computers. For example, software can be transferred from a website, server or other remote sources through a cable or over a wireless channel. Examples of the cables include coaxial cable, fiber optic cable, twisted pair cable, and digital subscriber line (DSL). Examples of the wireless channel include infrared frequency waves, radio frequency waves, and ultrahigh frequency waves. In this case, the coaxial cable, the fiber optic cable, the twisted pair cable, the DL, and the wireless channels fall within the definition of the medium. The disks or discs include a compact disc (CD), a laser disc (LD), an optical disc (OD), a digital versatile disc (DVD), a floppy disk (FD), and a Blu-ray disc. Discs generally refer to media from which data is optically read and disks refer to media from which data is magnetically read. Combinations of the above-mentioned media also fall within the definition of the computer-readable medium.

When forms are implemented as program code or code segments, the code segment may be a procedure, function, subprogram, program, routine, subroutine, module, software package, class, instructions, data structures, program command strings, or an arbitrary set of program command strings. One code segment may be connected with another code segment or a hardware circuit in a manner of transmitting and receiving information, data, arguments, parameters, or memory content. Information, arguments, parameters, data, and the like may be delivered, sent, or transmitted using any suitable means such as memory sharing, message delivery, token delivery, network transmission, and the like. In addition, in some aspects, steps and/or operations of a method or algorithm may reside on a mechanically readable medium and/or a computer-readable medium in the form of a combination or set of one or more codes and/or one or more instructions that can be integrated into a computer program product.

When implemented as software, the techniques described herein can be implemented as modules (for examples, procedures, functions, etc.) that perform the functions described herein. Software codes may be stored in a memory unit and may be executed by a processor. The memory unit may be embedded in a processor or may be provided outside a processor. In this case, the memory unit may be communicatively connected with the processor by various means known in the art.

When implemented as hardware, processing units may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices designed to perform the functions described herein, or any combination of these.

The above-mentioned ones include one or more exemplary forms. Of course, the above-described forms do not cover all possible combinations of components and/or methods to implement the present disclosure. Thus, those skilled in the art will appreciate that many further combinations and substitutions of components and/or methods in various forms are possible. Accordingly, the above-described forms cover all such alterations, modifications, and variations that fall within the spirit and scope of the appended claims. Moreover, as to the scope of the terms "comprises" used in the detailed description or the appended claims, it is noted that it is similarly interpreted as "comprising" that is used as a transitional word in the claims.

As used herein, the tams "infer" or "inference" generally refer to a process of determining or inferring a state of a system, environment, and/or user from a set of observations of events and/or data. Inferring can be used to identify a specific situation or action, or can generate a probability distribution of certain states, for example. Inferring is probabilistic. That is, inferring may mean a calculation of a probability distribution of those states, based on study on data and events. Inferring may involve techniques used to construct a higher level event from a set of events and/or data. The inference refers to a process of inferring new events or actions from a set of observed events and/or stored event data, determining whether events are closely correlated in time, and determining whether the events and data come from one or several events and data sources.

Moreover, terms such as "component", "module", and "system" used herein may refer to, not necessarily, computer entities such as hardware, firmware, any combination of hardware and software, software, and a software program being executed. For example, the term "component" may refer to, not necessarily, a process running on a processor, a processor, an object, an executable execution thread, a program, and/or a computer. Byway of illustration, both an application running on a computing device and the computing device itself may fall within the definition of the component. One or more components may reside within a process and/or an execution thread. One or more components may be collectively provided in one computer or distributed in two or more computers. In addition, these components can be executed on various computer readable media having various data structures stored thereon. Components can communicate a signal containing one or more data packets (for example, data from an arbitrary component that interacts with a local system, a component of a distributed system, and/or other systems on the basis of a signal that is transmitted over a network such as Internet) with a local and/or remote process.

What is claimed is:

1. An automated valet parking method comprising:
    activating an automated valet parking procedure;
    determining, by a parking infrastructure, a plurality of guide route candidates leading from a pickup zone to a target position;
    determining, by the parking infrastructure, weighting factors for the plurality of guide route candidates;
    selecting, by the parking infrastructure, one guide route candidate among the plurality of guide route candidates as a guide route to the target position based on the determined weighting factors;
    transmitting, by the parking infrastructure, the target position and the guide route to a vehicle;
    performing, by the vehicle, autonomous driving along the guide route and autonomous parking at the target position; and
    finishing the automated valet parking procedure,
    wherein in determining the weighting factors for the plurality of guide route candidates, the weighting factors are determined based on a number of blocks corresponding to narrow paths among a plurality of blocks included in each guide route candidate of the plurality of guide route candidates,
    wherein the number of blocks corresponding to the narrow paths is a number of blocks having a width smaller than a reference width among the plurality of blocks included in each guide route candidate of the plurality of guide route candidates,
    wherein the reference width is determined based on a length and a width of the vehicle; and
    wherein a weighting factor for a first guide route candidate of the plurality of guide route candidates is calculated by dividing a number of blocks corresponding to narrow paths included in the first guide route candidate of the plurality of guide route candidates by a sum of the number of blocks corresponding to the narrow paths included in each guide route candidate of the plurality of guide routes candidates.

2. The method according to claim 1,
    wherein in determining the weighting factors for the plurality of guide route candidates, the weighting factors are further determined based on a drive distance of each of the plurality of guide route candidates, and
    wherein a guide route candidate having a shortest drive distance among the plurality of guide route candidates is determined as the guide route.

3. The method according to claim 1,
    wherein in determining the weighting factors for the plurality of guide route candidates, the weighting factors are further determined based on a number of left and right turns on each guide route candidate of the plurality of guide route candidates, and
    wherein a guide route candidate having a smallest number of left and right turns among the plurality of guide route candidates is determined as the guide route.

4. The method according to claim 1,
    wherein a guide route candidate having a smallest number of blocks corresponding to the narrow paths among the plurality of guide route candidates is determined as the guide route.

5. The method according to claim 1,
    wherein a guide route candidate having a smallest number of moving vehicles present thereon, among the plurality of guide route candidates, is determined as the guide route.

6. The method according to claim 1, wherein the guide route from a current location of the vehicle to the target position is expressed as a curved line, a straight line, or both.

7. The method according to claim 1, wherein the guide route includes multiple waypoints and the target position.

8. A device for an automated valet parking, the device comprising a processor and a transceiver, wherein the processor is configured to:
  determine a target position,
  determine multiple guide route candidates to guide a vehicle from a pickup zone to the target position,
  determine weighting factors for the multiple guide route candidates,
  select one guide route candidate from the multiple guide route candidates as a guide route by applying the weighting factors to the multiple guide route candidates,
  transmit the target position and the guide route to the vehicle via the transceiver, and perform autonomous driving along the guide route and autonomous parking at the target position,
wherein the processor is further configured to determine narrow path count-based weighting factors for the multiple guide route candidates, and
wherein the narrow path count-based weighting factors is determined based on a number of blocks corresponding to the narrow paths among a plurality of blocks included in each guide route candidate of the multiple guide route candidate,
wherein the number of blocks corresponding to the narrow paths is a number of blocks having a width smaller than a reference width among the plurality of blocks included in each guide route candidate of the multiple guide route candidates,
wherein the reference width is determined based on a length and a width of the vehicle; and
wherein the weighting factor for a first guide route candidate of the multiple guide route candidates is calculated by dividing a number of blocks corresponding to narrow paths included in the first guide route candidate of the multiple guide route candidates by a sum of the number of blocks corresponding to the narrow paths included in each guide route candidate of the multiple guide routes candidates.

9. The device of claim 8,
wherein the weighting factors are further determined based on driving distances along the respective guide route candidates, and
wherein a guide route candidate having a shortest drive distance among the guide route candidates is determined as the guide route.

10. The device of claim 8,
wherein the processor is further configured to determine turn count-based weighting factors for the respective guide route candidates, and
wherein a guide route candidate having a smallest number of left and right turns among the guide route candidates is determined as the guide route.

11. The device of claim 8,
wherein a guide route candidate having a smallest number of blocks corresponding to the narrow paths among the guide route candidates is determined as the guide route.

12. The device of claim 8,
wherein a guide route candidate having a smallest number of moving vehicles present thereon, among the guide route candidates, is determined as the guide route.

13. The device of claim 8, wherein the guide route from a current location of the vehicle to the target position is expressed as a curved line, a straight line, or both.

14. The device of claim 8, wherein the guide route includes multiple waypoints and the target position.

* * * * *